Jan. 27, 1970 B. W. MATTHEWS 3,492,628

FUSE HOLDERS

Filed Sept. 20, 1967

Inventor
Benjamin William Matthews
By [illegible]
Attorneys 3,492,628
Patented Jan. 27, 1970

3,492,628
FUSE HOLDERS

Benjamin William Matthews, Small Heath, England, assignor to Joseph Lucas (Industries) Limited, Birmingham, England Filed Sept. 20, 1967, Ser. No. 669,023
Claims priority, application Great Britain, Sept. 30, 1966, 43,736/66
Int. Cl. H05k *1/12, 7/12;* H01r *9/00*
U.S. Cl. 339—17 3 Claims

ABSTRACT OF THE DISCLOSURE

A fuse holder including a printed circuit board, a first conductive clip engaged with, and supported by, the board, and incluing a base, electrically connected to a first conductor of the board, the clip further including a pair of arms integral with, and upstanding from, said base, and adapted at their ends to grip and make electrical connection to one end of a cartridge fuse, and a second clip similar to said first clip and engaged with and supported by the board, the base of said second clip being electrically connected to a second conductor of the board, and the arrangement being such that when a cartridge fuse is engaged with said first and second clips, said first and second conductors will be electrically interconnected through said fuse.

Figures 1, 2, 3:
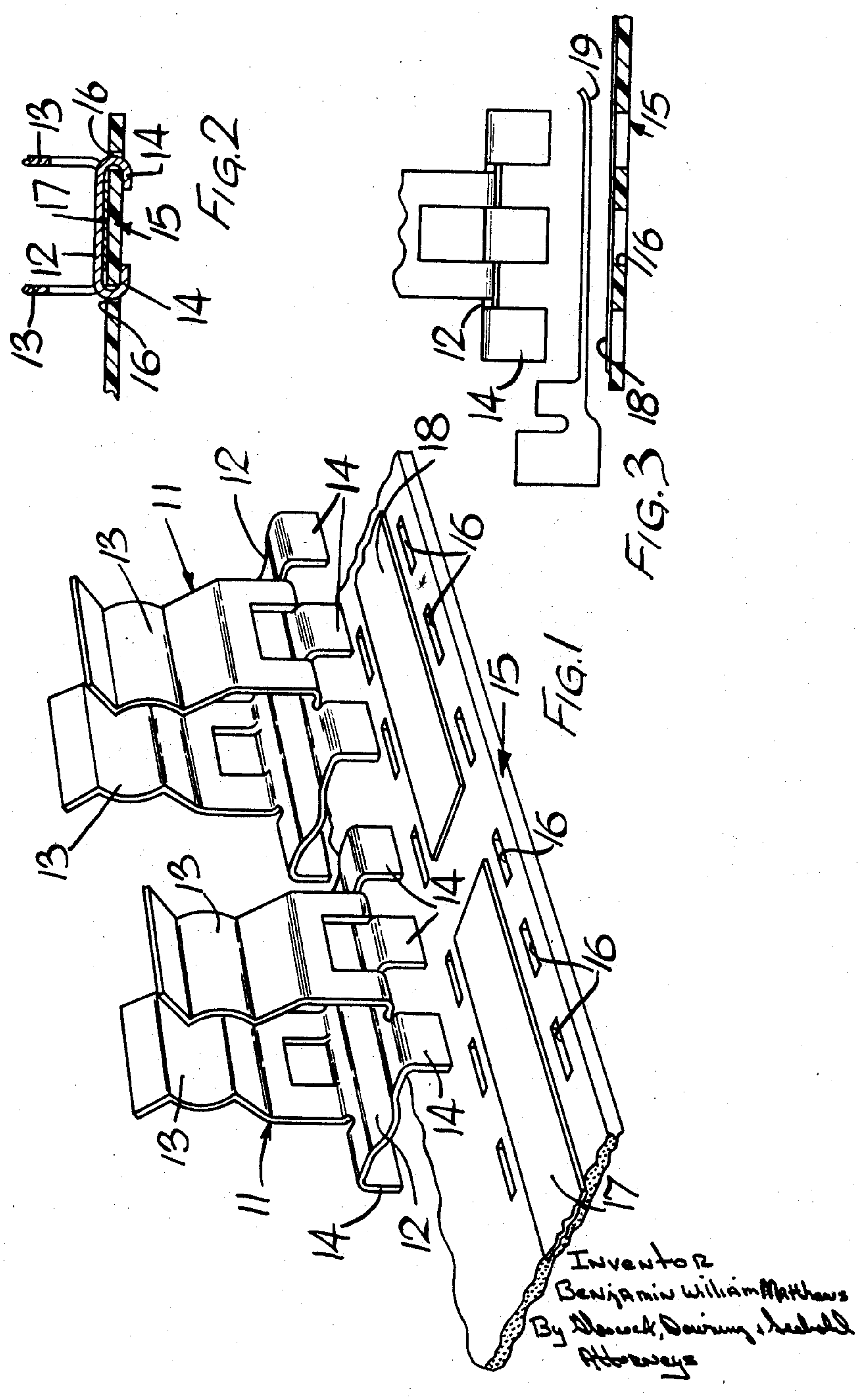

This invention relates to fuse holders for use with cartridge fuses.

A fuse holder according to the invention includes a printed circuit board, a first conductive clip engaged with, and supported by, the board and including a base electrically connected to a first conductor of the board, the clip further including a pair of arms integral with and upstanding from said base, and adapted at their ends to grip and make electrical connection to one end of a cartridge fuse, and a second clip similar to said first clip and engaged with and supported by the board, the base of said second clip being electrically connected to a second conductor of the board, and the arrangement being such that when a cartridge fuse is engaged with said first and second clips said first and second conductors will be electrically interconnected through said fuse.

The term printed circuit board as used herein includes an arrangement comprising a flexible printed circuit supported on a relatively rigid base.

One example of the invention is illustrated in the accompanying drawings wherein FIGURE 1 is a fragmentary exploded perspective view of a pair of fuse clips and their associated printed circuits, FIGURE 2 is a fragmentary sectional view of the parts in FIGURE 1 assembled and FIGURE 3 is a fragmentary exploded side view of a modification of the arrangement shown in FIGURE 1.

Referring to FIGURES 1 and 2, there is provided a pair of identical conductive clips 11 each of which includes a base 12 having upstanding therefrom a pair of arms 13 which are shaped at their upper ends to receive and grip between them the conductive end caps of a conventional cartridge fuse (not shown) extending downwardly from the base 12 are six tags 14. The base 12 of each clip 11 is bowed slightly to provide a convex lower surface.

In use each clip is engaged with a separate printed conductor on the same insulating base and a fuse is engaged with the clips to interconnect the two printed conductors.

In order to secure one of the clips 11 to a printed circuit board 15 six slots 16 corresponding in position with the tags 14 on the base of the clip 11 are formed in the board 15, three on each side of the conductor 17 thereof. The clip is then engaged with the board 15, the tags 14 passing through the slots 16 and the base resting in contact with the conductor 17. The base 12 is urged into contact with the conductor 17 and in so doing the base is flexed from a bowed configuration to a flat configuration whereupon the free ends of the tags 14 projecting from the slots 16 are bent over to maintain the clip in engagement with the board 15 (FIGURE 2). The tendency of the base 12 to return to its bowed configuration ensures a good electrical contact between the base 12 and the conductor 17.

The second clip 11 is connected on an identical manner to a conductor 18 which is aligned with the conductor 17 and a cartridge fuse is engaged with the clips to provide a fusible link between the conductors 17, 18.

Referring now to FIGURE 3 if it is desired to make an additional connection to the clips connectors 19 can be trapped between the conductors 17, 18 and clips 11 during assembly. The connectors 19 could be blade connectors or connectors adapted to receive a lead.

Having thus described my invention what I claim as new and desire to secure by Letters Patent is:

1. A fuse holder for use with a cartridge fuse comprising a printed circuit board, first and second exposed conductive areas on one surface of the board, first and second conductive clips secured to the board, each clip including a resilient base, a pair of arms upstanding from the base and adapted at their ends to grip and make electrical connection to one end of a cartridge fuse, and a plurality of tags which extend downwardly from the base and which are deformed to engage the surface of the printed circuit board remote from said one surface, the base of each clip being bowed so that in an unstressed condition the base of each clip presents a convex surface to said one surface of the board, the base of said first clip being engaged with said first exposed conductive area, the base of the second clip being engaged with said second exposed conductive area, and said bases being stressed to a substantially flat configuration when said tags are deformed to secure said clips to the board so that the resilience of each base, urges each base firmly into engagement with its respective exposed conductive area.

2. A conductive clip for use in a fuse holder as claimed in claim 1 including a conductive resilient base, a pair of arms integral with and upstanding from the base, said arms being adapted to grip and make electrical contact with one end of a cartridge fuse, and a plurality of deformable tags integral with and extending downwardly from opposite edges of the base, the base being bowed to produce a convex surface between said opposite edges thereof and on the side of the base remote from said arms.

3. A fuse holder for use with a cartridge fuse comprising a printed circuit board, first and second exposed conductive areas on one surface of the board, first and second conductive clips secured to the board, each clip including a resilient base, a pair of arms upstanding from the base and adapted at their ends to grip and make electrical connection to one end of a cartridge fuse, and a plurality of tags which extend downwardly from the base and which are deformed to engage the surface of the printed circuit board remote from said one surface, the base of each clip being bowed so that in an unstressed condition the base of each clip presents a convex surface to said one surface of the board, the base of said first clip being engaged with said first conductive area, the base of said second clip being engaged with a flat conductive blade portion of a terminal member which includes an integral portion adapted to be electrically connected to a conductive lead and said blade portion of said terminal member being engaged with said second conductive area, the bases of said first and second clips being stressed to a substantially flat configuration when said tags are deformed, to secure the clips to the board, so that the resilience of the base of the first clip urges the base of the first clip firmly into engagement with said first conductive area and the resilience of the base of the second clip urges the base of the second clip firmly into engagement with said blade portion and urges said blade portion firmly into engagement with said second conductive area.

References Cited

UNITED STATES PATENTS

| | | | |
|---|---|---|---|
| 1,536,149 | 5/1925 | Schmid | 339—220 |
| 2,229,989 | 1/1941 | Roby | 339—220 XR |
| 2,898,519 | 8/1959 | Foster. | |
| 2,380,114 | 7/1945 | Kurillo. | |

FOREIGN PATENTS

| | | |
|---|---|---|
| 857,975 | 1/1961 | Great Britain. |
| 916,077 | 1/1963 | Great Britain. |

MARVIN A. CHAMPION, Primary Examiner

P. A. CLIFFORD, Assistant Examiner

U.S. Cl. X.R.

339—220, 258